US008351913B2

(12) United States Patent
Ramanathan et al.

(10) Patent No.: US 8,351,913 B2
(45) Date of Patent: Jan. 8, 2013

(54) MERGING CALL NOTIFICATIONS IN CROSS RINGING SYSTEMS

(75) Inventors: Rajesh Ramanathan, Redmond, WA (US); Pradipta Kumar Basu, Redmond, WA (US); Amritansh Raghav, Seattle, WA (US); Nikhil P. Bobde, Redmond, WA (US); Sriram K. Parameswar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 12/014,207

(22) Filed: Jan. 15, 2008

(65) Prior Publication Data
US 2009/0181657 A1 Jul. 16, 2009

(51) Int. Cl.
*H04M 3/42* (2006.01)
(52) U.S. Cl. .............. 455/415; 455/576; 379/211.04; 379/88.17; 379/88.19; 379/88.2
(58) Field of Classification Search .......... 379/211.04, 379/88.17, 88.19, 88.2; 455/415
See application file for complete search history.

(56) References Cited

U.S. PATENT DOCUMENTS

| 5,926,464 | A | * | 7/1999 | Fraser | 370/259 |
| 7,002,912 | B2 | | 2/2006 | Wengrovitz | |
| 7,298,833 | B2 | * | 11/2007 | Klein et al. | 379/201.02 |
| 7,822,188 | B1 | * | 10/2010 | Kirchhoff et al. | 379/211.02 |
| 7,881,449 | B2 | * | 2/2011 | Hanson et al. | 379/211.02 |
| 8,121,626 | B1 | * | 2/2012 | Kirchhoff et al. | 455/466 |
| 2003/0063733 | A1 | * | 4/2003 | Levine et al. | 379/211.04 |
| 2003/0108064 | A1 | * | 6/2003 | Bilke et al. | 370/466 |
| 2004/0125931 | A1 | * | 7/2004 | Archer | 379/201.01 |
| 2005/0190747 | A1 | * | 9/2005 | Sindhwani et al. | 370/352 |
| 2006/0072726 | A1 | | 4/2006 | Klein et al. | |
| 2006/0106675 | A1 | * | 5/2006 | Cohen et al. | 705/26 |
| 2007/0015535 | A1 | | 1/2007 | LaBauve et al. | |
| 2007/0064672 | A1 | | 3/2007 | Raghav et al. | |
| 2007/0064886 | A1 | | 3/2007 | Chiu et al. | |
| 2007/0092073 | A1 | | 4/2007 | Olshansky et al. | |
| 2007/0130340 | A1 | | 6/2007 | Alperin et al. | |
| 2007/0206568 | A1 | | 9/2007 | Silver et al. | |
| 2007/0263808 | A1 | * | 11/2007 | Van Wyk et al. | 379/142.01 |
| 2008/0152123 | A1 | * | 6/2008 | Pazhyannur et al. | 379/373.01 |

OTHER PUBLICATIONS

A call to power; http://www.cxo.eu.com/pastissue/article.asp?art=25810&issue=148 (8 pgs.)
Microsoft Office Communications Server 2007 Planning Guide; http://download.microsoft.com/download/1/e/3/1e3d4fa7-5c8f-48be-b6b5-6827a36a1dbd/OCS_Planning_Guide.doc (211 pgs.).

* cited by examiner

*Primary Examiner* — Lester Kincaid
*Assistant Examiner* — Isaak R Jama
(74) *Attorney, Agent, or Firm* — Merchant & Gould

(57) ABSTRACT

Multiple instances of an incoming call in an integrated system capable of communicating through multiple networks are associated such that the called party is provided a single (merged) notification along with options to select among available call types. The call is established using a selected network and end device registered to the called user. Association of the instances is accomplished by comparing caller identity derived from a variety of information associated with the calling party. Conversation or correlation IDs are used to associate the instances as being for the same call and with other related communications such as a related instant messaging session.

18 Claims, 8 Drawing Sheets

MERGING CALL NOTIFICATIONS IN CROSS RINGING SYSTEMS

BACKGROUND

In telecommunication, telephony is the term for the general use of equipment to provide voice communication over distances, specifically by connecting telephones to each other. Telephones originally were connected directly together in pairs. Each user had separate telephones wired to the various places they might wish to reach. With the invention of the telephone exchange, each telephone could be connected to other local ones and eventually far away phones.

In modern systems, equipment at the exchange connects a telephone line to another in the same wire center, or to a trunk at a distant exchange when the user of a telephone wants to make a telephone call. The exchanges together form the Public Switched Telephone Network ("PSTN"). Digital telephony is the use of digital technology in the provision of telephone services and systems. Almost all telephone calls are provided this way, but sometimes the term is restricted to cases in which the last mile is digital or where the conversion between digital and analog signals takes place inside the telephone.

IP Telephony is a modern form of telephony which uses the TCP/IP protocol popularized by the internet to transmit digitized voice data. Computer Telephony Integration ("CTI") enables computers to know about and control phone functions such as making and receiving voice, fax, and data calls with telephone directory services and caller identification. The integration of telephone software and computer systems is a major development in the evolution of the automated office. With the proliferation of various types of telephony systems, it is not uncommon to have two or more independent systems exist side-by-side in a location.

Users of two or more independent systems may experience cross ringing where a single incoming call is directed to multiple end devices (or even client applications). For example, a call from an external network such as a PSTN may be directed to a user's desktop device and mobile device on a Voice Over IP (VOIP) network. Similarly, calls from a mobile network (e.g. a cellular network) may also be connected to the user through the mobile network directly or through a combination of the mobile network with the VOIP network.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing call origination information to a user in cross ringing systems such that the user can determine a call simultaneously delivered to two or more end devices is the same call. The user is enabled to select among a plurality of options for connection. Following the user's selection, call connection is established through the selected path.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, call notifications to multiple end devices are merged in cross ringing systems to prevent user confusion and enable easier user selection of connection options. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
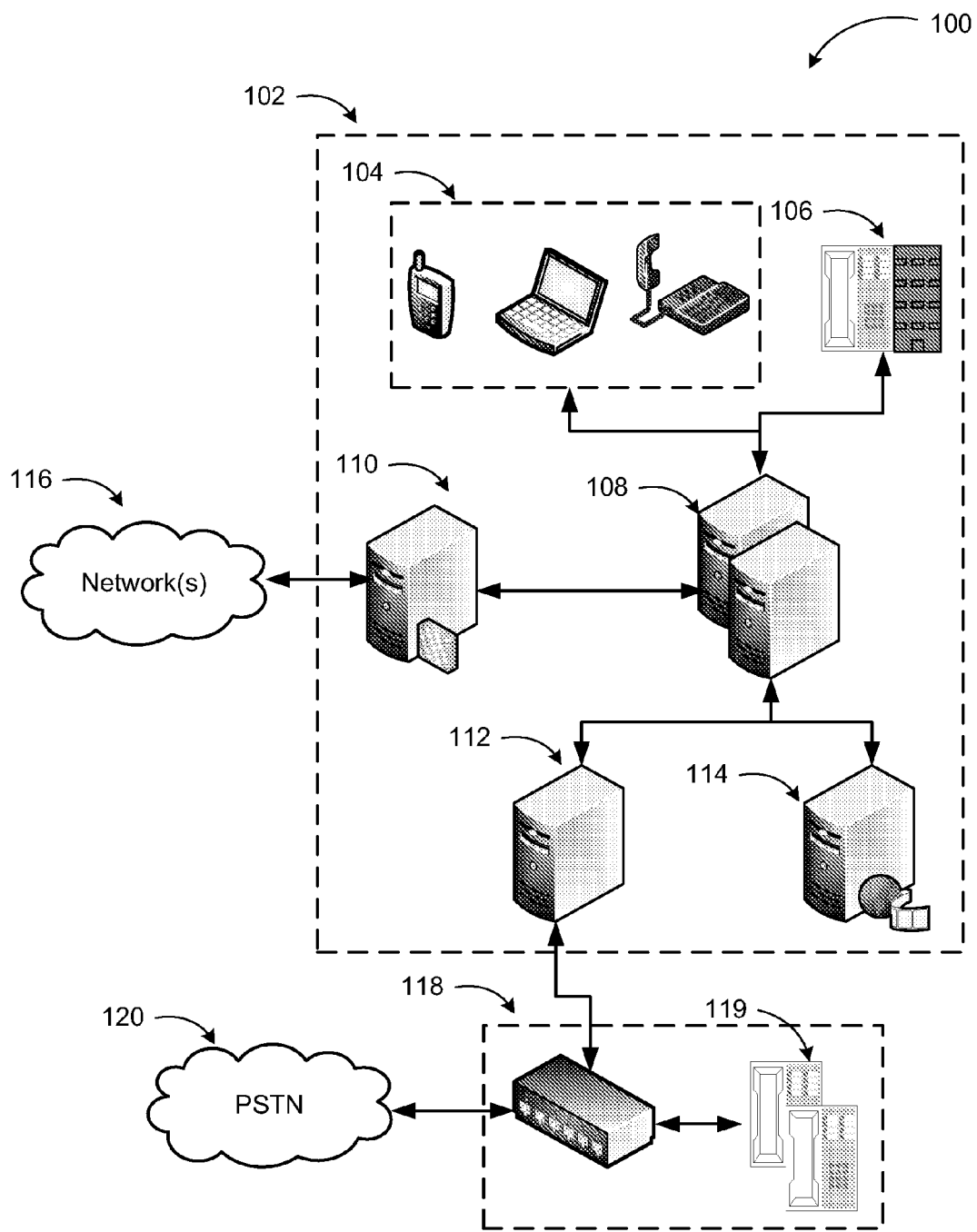
FIG. 1 is a diagram illustrating an example integrated telephony system architecture, where a call may be delivered to multiple end devices simultaneously.

Referring to FIG. 1, diagram 100 of an example integrated telephony system architecture, where a call may be delivered to multiple end devices simultaneously, is illustrated. Cross ringing systems are those where a single call is sent to two or more different systems either parallel or serially such that the user is able to take advantage of distinct abilities of the systems to answer the call. For example, a VOIP system may provide a number of capabilities not available in a PSTN or cellular phone system. In a unified communication system such as system 102, client devices/applications allow access to multiple systems and are able to allow the user to receive the call through the most appropriate one.

In FIG. 1, end devices 104 and 106 are client devices of the UC system 102, which may execute communication applications such a voice communication, video communication, and the like. In addition to their advanced functionality, the end devices may also facilitate traditional phone calls through an external connection such as through PBX 118 and Public Switched Telephone Network (PSTN) 120. End devices may include any type of smart phone, cellular phone, computer application, and advanced phone devices with additional functionality (e.g. phone 106).

UC server 108 provides registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC server 108 is configured to provide access to these additional communication modes (e.g. instant messaging, video communication, etc.) through access server 110. Access server 110 resides in a perimeter network and enables connectivity through network 116 with other users in one of the additional communication modes.

Audio/Video (A/V) conferencing server 114 provides audio and/or video conferencing capabilities by facilitating those over an internal or external network. Mediation server 112 mediates signaling and media to and from the PBX 118. Mediation server 112 may also act as a Session Initiation Protocol (SIP) user agent (e.g. Business-To-Business User Agent "B2BUA"). PBX 118 includes a PBX controller and associated traditional phone devices. PBX 118 facilitates receipt and origination of calls through PSTN 120, which is typically a combination of networks managed by a number of providers.

In a system according to embodiments, users are enabled to share the same identity in both communication systems. The address for the shared identity is used in inbound and outgoing calls. Therefore, the existence of two telephony systems is transparent for other users who interact with the user of the integrated telephony systems. The shared identity is not necessarily limited to a phone number. The identity may take any form depending on the integrated networks, such as a telephone number, a SIP Uniform Resource Identifier (URI), or any other identifier. Furthermore, the shared identity may be in more than one format. For example, it may include a phone number and a SIP URI (using an alias). The phone number is used throughout this text as example for integrated networks that include a PSTN compatible network, but embodiments are not limited to phone numbers of any particular type of shared identity.

In one example scenario, a user may be part of UC system 102 as well as PBX system 118 being able to receive calls through a variety of end devices. When a call comes in to the user's Direct Inward Dial (DID) number, the call is sent (or forked) to both UC system 102 and the PBX 118. A UC client operating end devices registered to the user receives a VOIP Call from UC server 108. In the same instance, UC server 108 is monitoring the PBX 118 for incoming calls to the PBX phone 119. Thus, the UC client also gets a Remote Call Control (RCC) notification of an incoming call. Effectively, the UC client has "two" rings and the user is able to answer the call through the PBX phone 119 through any of the end devices 104 controlled by the UC client (VOIP call).

Figure 2:
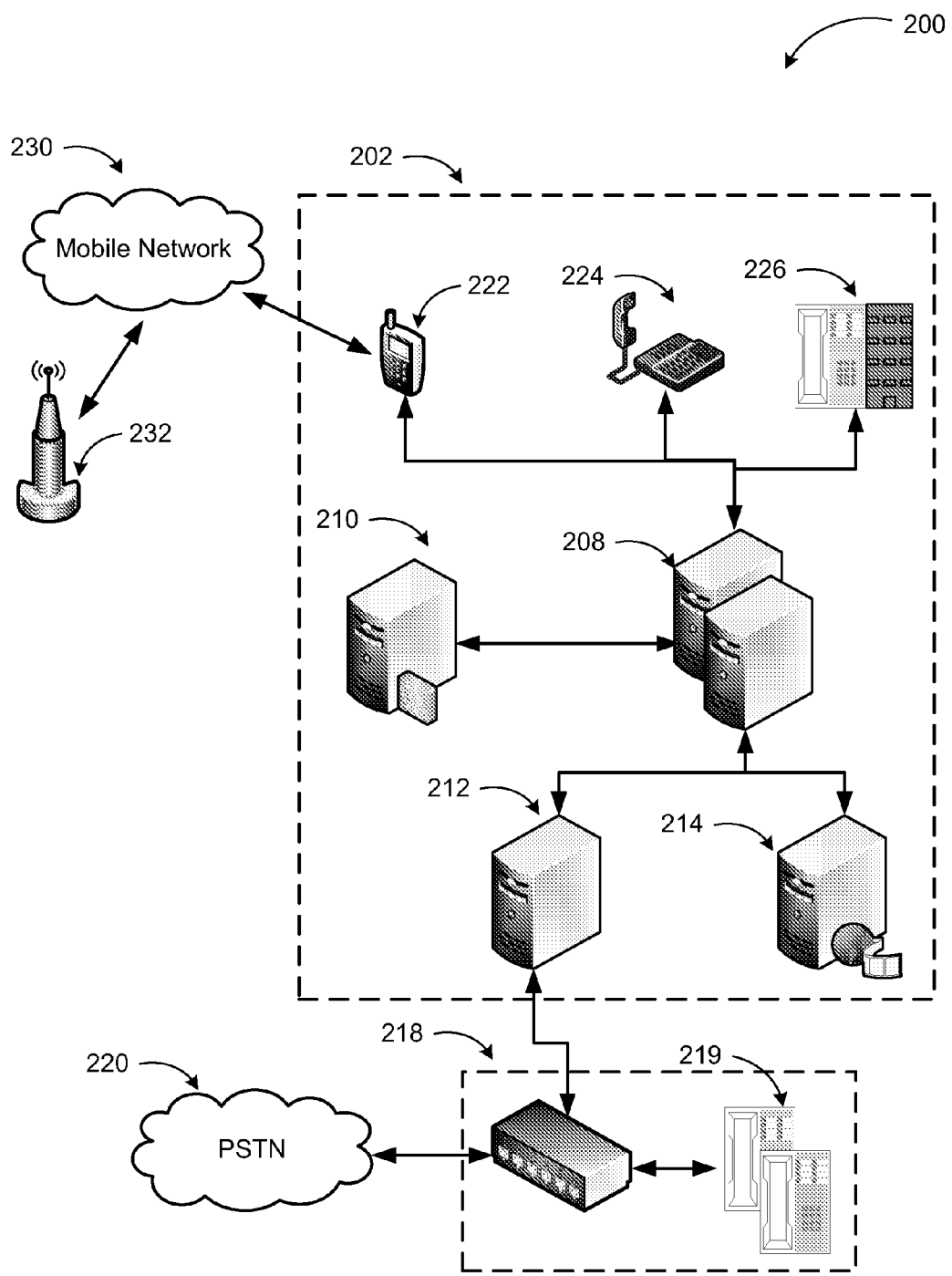
FIG. 2 illustrates another example integrated telephony system, where a mobile call may be delivered directly or through a unified communication system (e.g. VOIP) path to a user's mobile device.

FIG. 2 illustrates another example integrated telephony system, where a mobile call may be delivered directly or through a unified communication system (e.g. VOIP) path to a user's mobile device. Example integrated system 200 includes UC system 202 described above. One of the end devices in UC system 202 is mobile device 222, which may receive calls through the UC system or through an external mobile network 230. Mobile network 230 may be any wireless communication network such as a cellular network and include other components such as transceiver 232 (e.g. cell tower). System 200 may include other components such as PBX system 218 that facilitates communications through PSTN 220.

To illustrate the variety of communication systems that may be integrated employing various embodiments, PBX 218 may adhere to Session Initiation Protocol (SIP). The Session Initiation Protocol (SIP) is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients use Transport Control Protocol ("TCP") or User Datagram Protocol ("UDP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

SIP is intended to provide a signaling and call setup protocol for IP-based communications that can support a superset of the call processing functions and features present in the PSTN. SIP by itself does not define these features, however. Rather, its focus is call-setup and signaling. SIP is also designed to enable the building of such features in network elements known as proxy servers and user agents. These are features that permit familiar telephone-like operations: dialing a number, causing a phone to ring, hearing ring back tones or a busy signal.

SIP-enabled telephony networks can also implement many of the more advanced call processing features. SIP is a client/server protocol that enables peer-to-peer connectivity because each side can function as a client and a server at the same time. As such it requires a relatively simple core network with intelligence distributed to the network edge, embedded in endpoints (end devices built in either hardware or software). SIP features are implemented in the communicating endpoints (i.e. at the edge of the network) as opposed to being implemented in the network. While some example systems are described with SIP features, many other VOIP protocols exist and embodiments may be implemented with any of those protocols using the principles described herein.

In the example system 200 of FIG. 2 UC system 202 includes UC end devices 222, 224, and 226 managed by UC server(s) 208. Access server 210, A/V conference server 214, and mediation server 212 operate as described above in conjunction with FIG. 1. Optional PBX system 218 includes a PBX controller and PBX end devices (219) that facilitate communications through PSTN 220. UC system 202 may also support UC server(s) that connect to a Time Division Multiplex ("TDM") PBX through mediation server 212. The system(s) may also include a number of gateways (e.g. basic or advanced gateways) for facilitating mediation functionalities. As mentioned above, PBX 218 may also be a SIP PBX in which case the UC system 202 may support SIP and/or RTP based communication.

According to another scenario, a user may use UC mobile device 222 controlled by the UC client application. UC mobile device 222 is capable of getting cellular calls from the local mobile network 230 (such as a GSM network) as well as VOIP calls through UC system 202. Calls may be sent as both VOIP as well as native GSM to such a device. In this case, UC client application, which may be a mobile application executed on the UC mobile device 222) has the capability to answer the incoming calls in the GSM system, answer as a VOIP call, or even divert VOIP calls to GSM calls.

While the example systems in FIGS. 1 and 2 have been described with specific components such as mediation server, A/V server, and the like, embodiments are not limited to these components or system configurations and can be implemented with other system configuration employing fewer or additional components. Functionality of the systems enabling integration of two independent telephony systems with merged call notifications may also be distributed among the components of the systems differently depending on component capabilities and system configurations.

One theme which is common to cross ringing systems is the concept of multiple incoming call notification for a client that is capable of receiving calls from both systems at the same time. On its own, such a system may produce two notifications or "toasts" for the end user, which can be sequential or in parallel in nature. Embodiments provide mechanisms for merging the two notifications ("toasts") into one allowing the user to realize a single call is coming in and select the system through which to accept the call.

According to one embodiment in UC and PBX system combinations a notification merge logic on the UC client may be utilized to enable the UC client to display a single notification (visual and/or audio). According to another embodiment, a mobile user receiving calls forwarded from the UC system may be provided a VOIP SIP INVITE transaction that precedes the mobile network call setup (e.g. GSM setup) and carries the display name and the phone number of the caller. When the user receives such a VOIP INVITE and selects to accept the call, the UC client may deflect the call through the mobile network and merge the incoming mobile call to the accepted VOIP Call. The user may optionally decide to accept the VOIP call directly. Various incoming call scenarios are illustrated below in FIGS. 3-5 as action flow diagrams.

Figure 3:
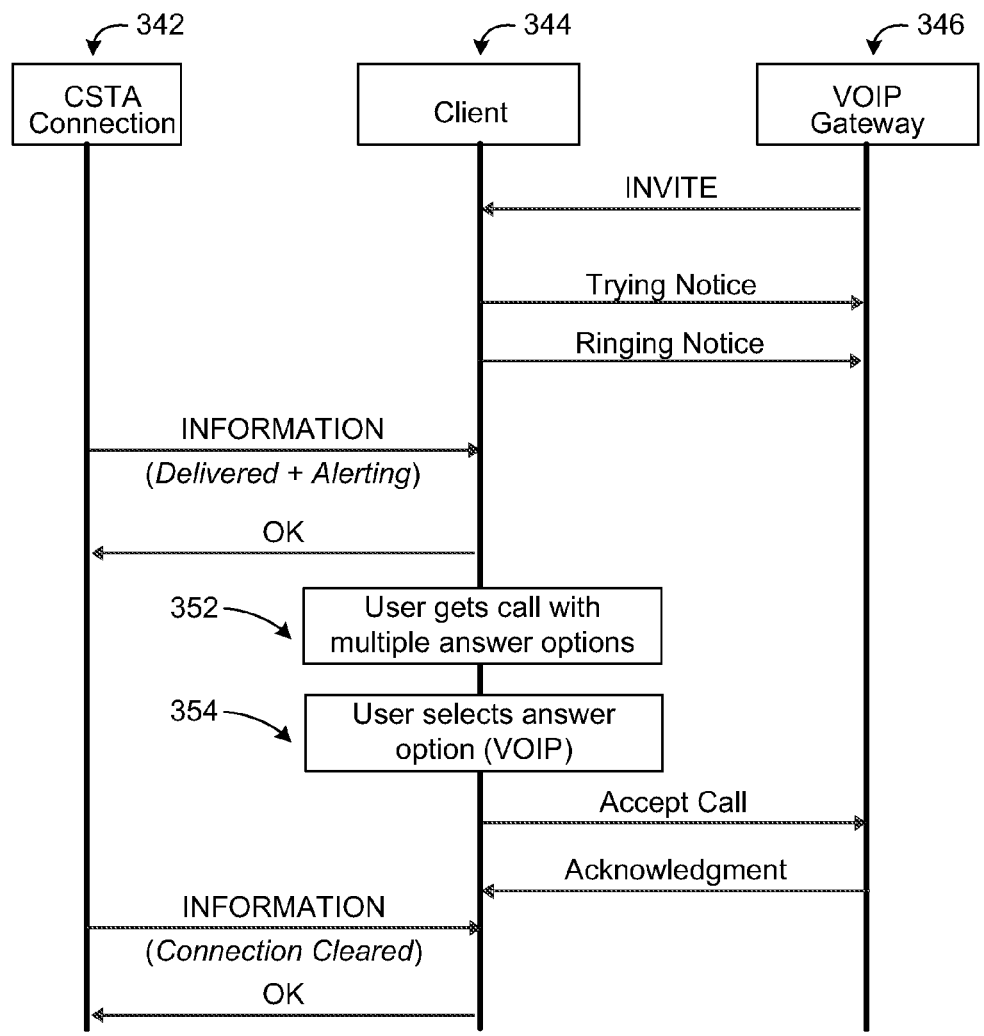
FIG. 3 is an action flow diagram illustrating actions in an integrated telephony system according to embodiments for a call originating from a PBX system and being delivered to multiple end devices associated with a user.

FIG. 3 is an action flow diagram illustrating actions in an integrated telephony system according to embodiments for a call originating from a PBX system and being delivered to multiple end devices associated with a user.

In the action flow diagram, basic interactions between Computer Supported Telecommunication Application (CSTA) Connection 342, UC client 344, and VOIP Gatewat 346 (PBX) are shown. CSTA Connection 342 performs information delivery and connection establishment tasks, while UC client 344 manages the end devices registered to the user for receiving calls from various networks and VOIP gateway 346 provides an interface for the UC system to the PSTN.

According to some embodiments, both the VOIP call and the RCC call that are presented to the UC client have at least one identifier associated with them (e.g. a TEL URI or a SIP URI) identifying the calling entity, among other things. UC client uses the identifier(s) to perform a reverse number (or URI) lookup in a contact database. The contact database may be as simple as a list of phone numbers or as complicated as a global address book also associated with electronic mail, instant messaging, etc., applications. The corresponding contact is then identified as the calling entity. If the VOIP call is delivered first, UC client uses one of the above identifiers to associate the address delivered via the associated signaling with a contact.

When the subsequent call (e.g. RCC call) instance is delivered, the UC client may again use one of the above methods to associate that call also with a contact. Then, the derived addresses from both call instances are compared. If there is a match, the UC client associates the two calls as being the same and merges the call notification. To associate the calls, a correlation ID may be generated by the UC client and assigned to the associated calls identifying them as being the same. The call notification may be a visual, audio, or combination alert. In a UC system with additional capabilities, further call parameter information (call time, call origination, call type, etc.) may also be provided in the merged notification in form of a conversation pop-up or conversation window.

According other embodiments, various communications (instant messaging, electronic mail, video conference, phone calls, and the like) may be assigned a conversation ID, which may be used to identify the different communications as being associated. For example, two users may be in communication using instant messaging and call one another during the instant messaging session. By assigning the same conversation ID to both communications, the system enables the user(s) to keep track of ongoing communications, store related information, and so on. The conversation ID may also be used to merge notifications for an incoming call in a cross ringing system.

According to the example scenario in FIG. 3, a call request is received by the UC client 344 with an INVITE message being sent from VOIP Gateway 346. The INVITE message may include an identifier such as a caller ID or a SIP URI associated with the caller. While processing the received call, UC client 344 responds to VOIP Gateway 346 with notices indicating that it is trying to deliver the call and/or ringing the end device(s) registered to the user. In the meantime, CSTA Connection 342 provides information that the call is delivered and client alerted, to UC client 344.

UC client 344 provides the user with a merged notification (toast) that indicates the user has multiple choices of answering the call (352). The choices may be the VOIP call or a direct PBX call. Once the user selects and answer option (354), in the example scenario the VOIP call, UC client 344 send an accept call message to the VOIP Gateway 346. VOIP Gateway 346 sends back an acknowledgment message establishing the call. Upon establishment of the VOIP call, CSTA Connection 342 sends another information message to UC client 344 indicating that the connection has been cleared.

Figure 4:
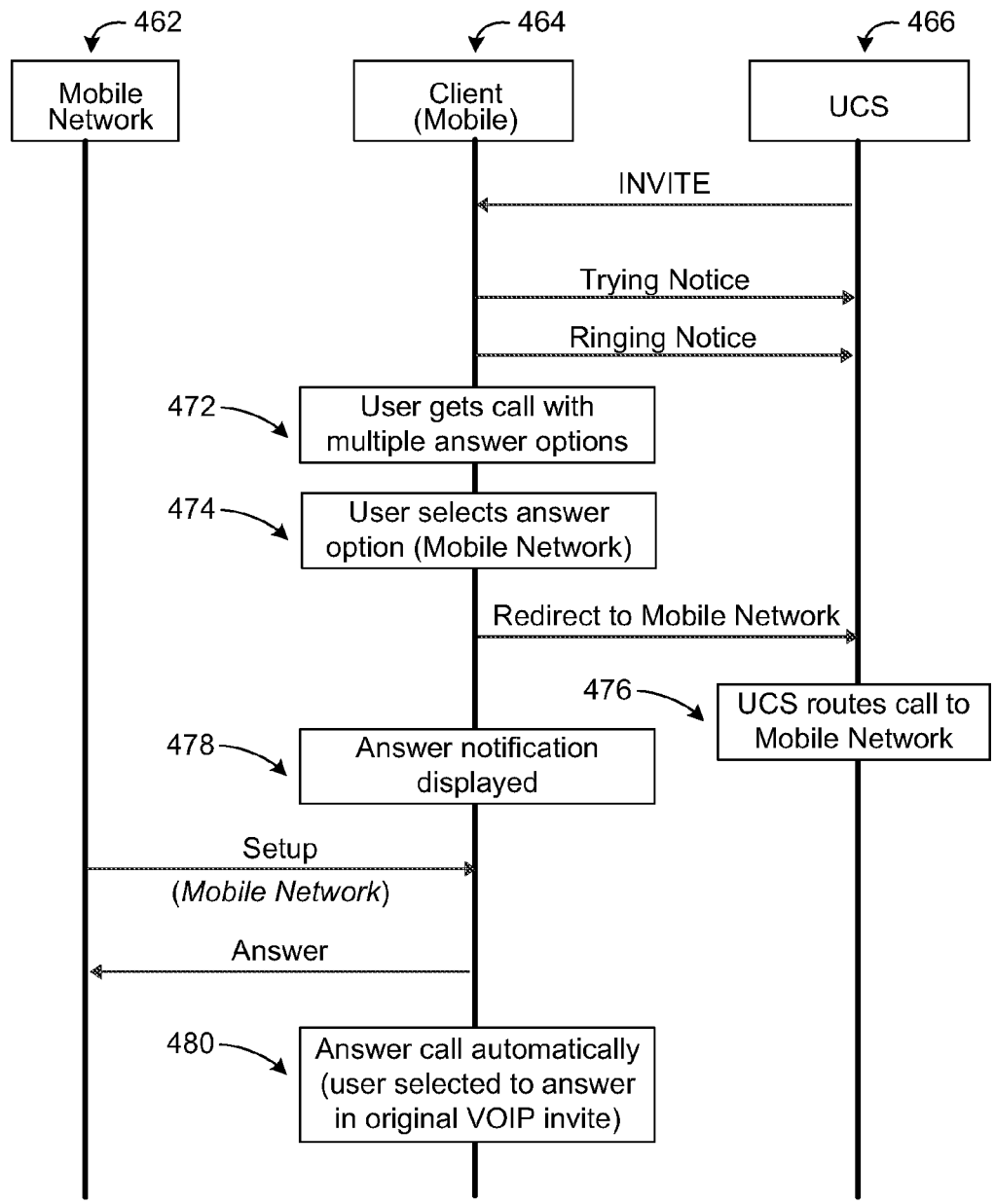
FIG. 4 is an action flow diagram illustrating actions in an integrated telephony system according to embodiments for a call originating from a mobile network and being re-routed to an end device associated with a user.

FIG. 4 is an action flow diagram illustrating actions in an integrated telephony system according to embodiments for a call originating from a mobile network and being re-routed to an end device associated with a user.

In the mobile scenario, the VOIP invite from UC system 466 for the incoming call precedes the setup from the mobile network 462. When the user answers the call selecting the mobile network path, a signal is sent to the UC system to route the call through the mobile network. The re-routed call is automatically answered and merged to the existing answered call. It should be noted that this "re-routing" may result in delayed establishment of the mobile network calls.

According to the example scenario in FIG. 4, a call is received from mobile network 462 (e.g. a GSM network). UC system 466 notifies UC client 464 with an invite message and provides the options of accepting the call as a mobile network call or as a VOIP call. As above, UC client 464 sends back trying and ringing notices while providing the user with a merged notification indicating multiple options to accept the call (472). Once the user selects the answer option (474), in this case the mobile network, UC client 464 notifies UC system 466 to redirect the call to the mobile network. UC system 466 routes the call to the mobile network (476), while the UC client 464 displays answer notification to the user (478). This is followed by the mobile network 462 performing setup and receiving acceptance answer from UC client 464. When the setup is complete, the call is automatically answered (480), since the user originally selected the mobile network in the original invite from the UC system 466.

Figure 5:
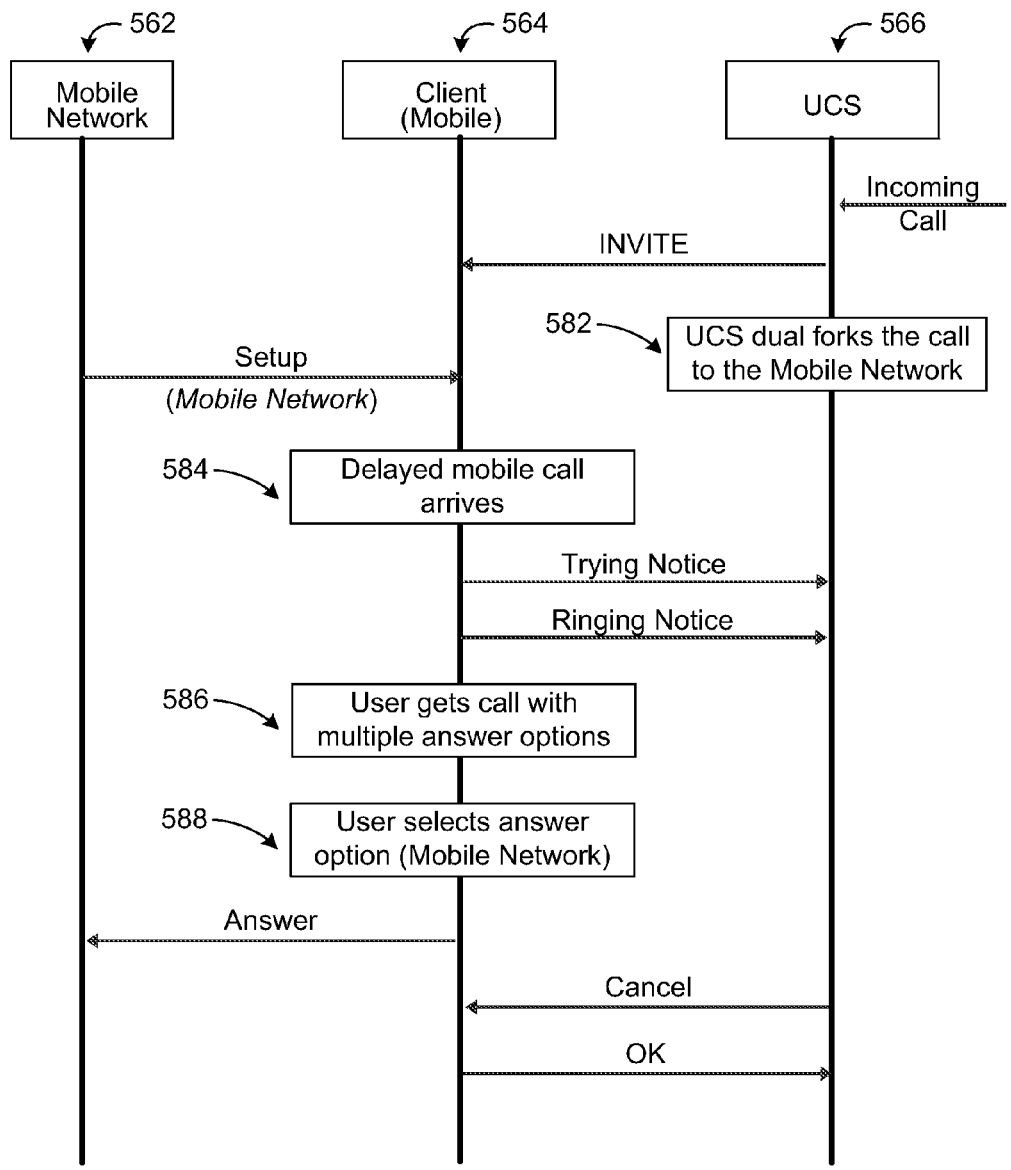
FIG. 5 is another action flow diagram illustrating actions in an integrated telephony system according to embodiments for a call originating from a mobile network and being re-routed to an end device associated with a user, where the call is dual forked to the mobile network and a setup delay in the mobile network leveraged for allowing the user to get a merged notification.

FIG. 5 is another action flow diagram illustrating actions in an integrated telephony system according to embodiments for a call originating from a mobile network and being re-routed to an end device associated with a user, where the call is dual forked to the mobile network and a setup delay in the mobile network leveraged for allowing the user to get a merged notification.

As mentioned above, the mobile network setup following selection of the answer option by the user and notification of the UC system may result in delayed establishment of the call. The action flow diagram in FIG. 5 shows an alternative method of merging call notifications from a mobile network to minimize such delays. When UC system 566 receives incoming call from mobile network 562, it sends the invite to the UC client 564. The mobile network 562 is allowed to set up the call with the UC client 564, which provides the merged notification (586) and receives user selection (588) while the delayed call is being set up (584). If the user's choice is mobile network, the call is answered without further delay. On the other hand, if the user chooses VOIP call option (through the UC system), the mobile call may be cancelled and deflected to the UC system to establish it as a VOIP call.

The operations and approaches, as well as components of the cross ringing telephony systems, described in FIG. 3-5 are exemplary for illustration purposes. A cross ringing telephony system merging call notifications may be implemented using additional or fewer components and other schemes using the principles described herein.

Figure 6:
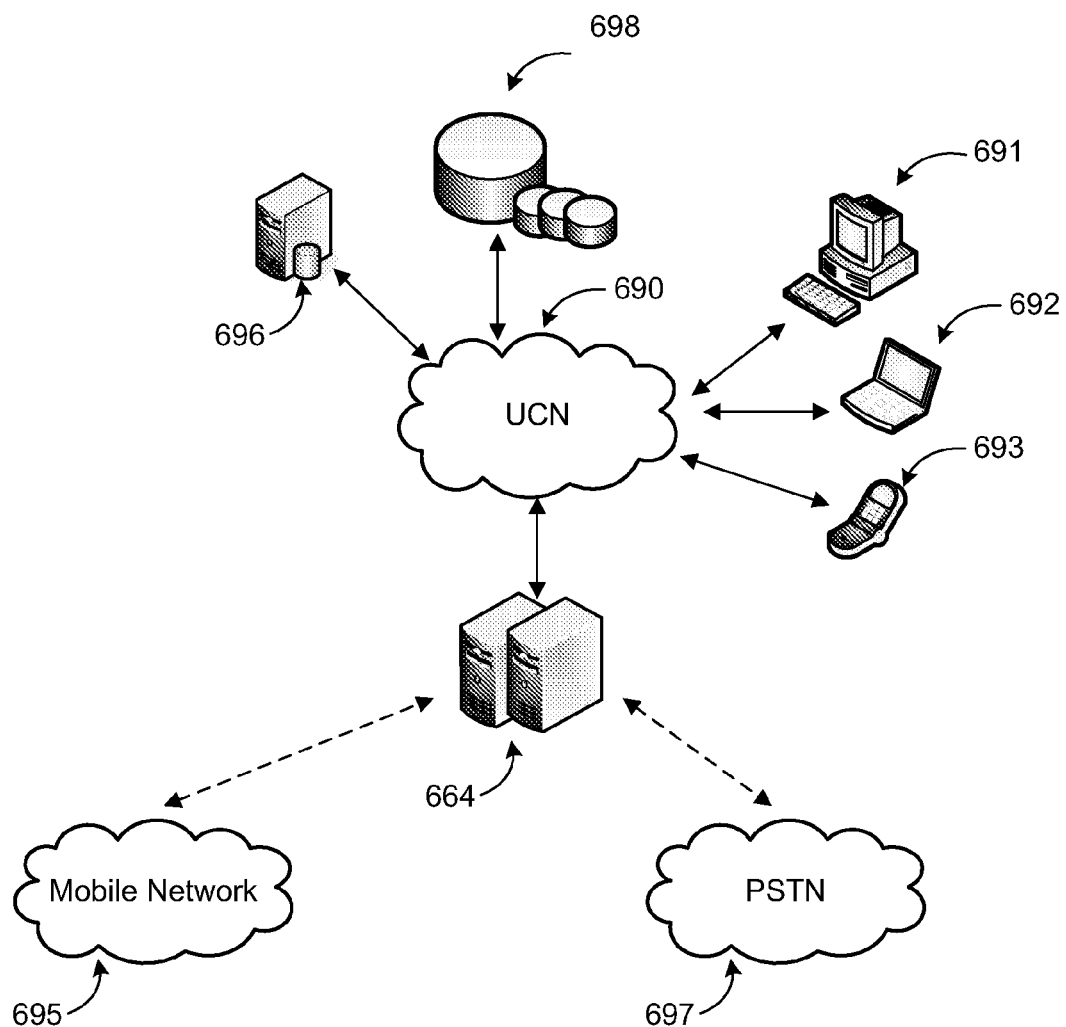
FIG. 6 illustrates a networked environment where embodiments may be implemented.

FIG. 6 is an example networked environment, where embodiments may be implemented. A cross ringing telephony system such as those described previously may be implemented locally or in a distributed manner over a number of physical and virtual clients and servers. Such a system may typically involve at least two distinct networks such as PSTN 697, Mobile Network 695, and UCN 690. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. While an integrated telephony system employing call notification merging may involve many more components, typical and relevant ones are discussed in conjunction with this figure.

A more advanced digital telephony system such as a unified communication system employing call notification merging may reside side-by-side with mobile networks, public switched networks, etc. and communicate through those networks with the help of PBX systems, gateways, and so on. Mediation server(s) 694 may provide signaling and media exchange between the two systems. The UC system may also include a UC server (not shown) for registering, routing, and other functionality. Data associated with the system configuration (e.g. user names, phone numbers, call policies, configuration, records, etc.) may be stored in one or more data stores such as data stores 698, which may be directly accessed by the servers and/or clients of the system or managed through a database server 696. The backbone of the UC system may be provided by a UC network (UCN) 690, which may employ a number of protocols such as SIP, RTP, and the like. Client devices (e.g. 691-693) provide platforms for UCN user end points. Users may access the communication system using a client device or one or more client applications running on a client device.

UCN 690 may include a secure network such as an enterprise network, an unsecure network such as a wireless open network, or the Internet. UCN 690 provides communication between the nodes described herein. By way of example, and not limitation, UCN 690 may include wired media such as a wired network or direct-wired connection, and wireless media such as acoustic, RF, infrared and other wireless media.

Many other configurations of computing devices, applications, data sources, data distribution systems may be employed to implement a cross ringing telephony system with call notification merging. Furthermore, the networked environments discussed in FIG. 6 are for illustration purposes only. Embodiments are not limited to the example applications, modules, or processes.

Figure 7:
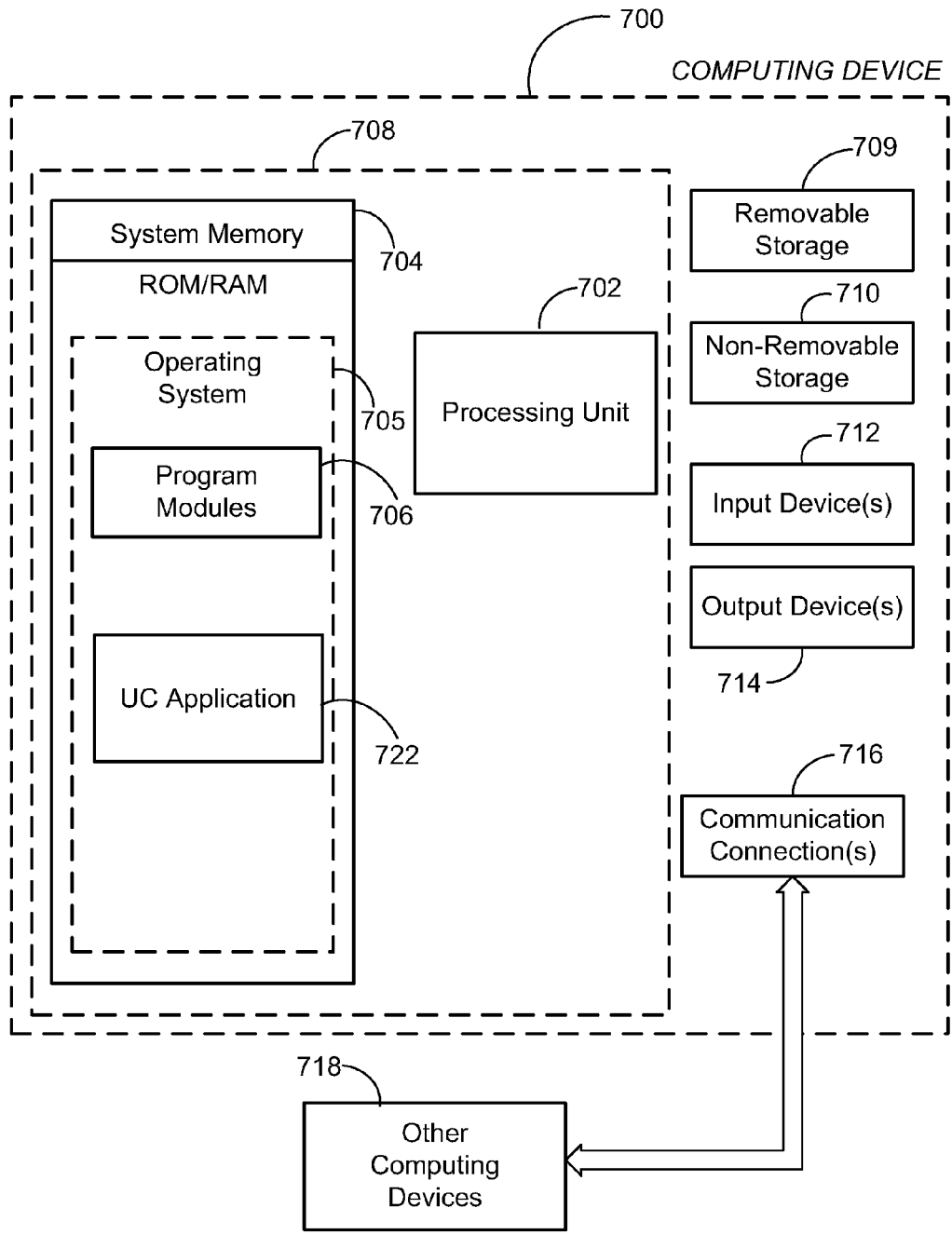
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be a server executing a UC client application for managing end devices registered with one or more users. Computing device 700 may typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the computing device, such as the WINDOWS® operating systems from MICROSOFT CORPORATION of Redmond, Wash.

The system memory 704 may also include one or more software applications such as program modules 706 and UC application 722.

UC application 722 may be a separate application or an integral module of a hosted service application that provides advanced communication services through computing device 700. As discussed above, UC application 722 may coordinate notification of incoming calls from various sources, determine if a call arriving through different paths is the same call, merge call notifications, and facilitate establishment of the call through a path selected by the user. UC application 722 may employ different methods in determining same calls and merging notifications such as assigning correlation IDs, conversation IDs, etc.

UC application 722 may also provide advanced functionalities of the UC system to the user such as those associated with other forms of communication (video, instant messaging, etc.). This basic configuration is illustrated in FIG. 7 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include client devices of a UC network as discussed above. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
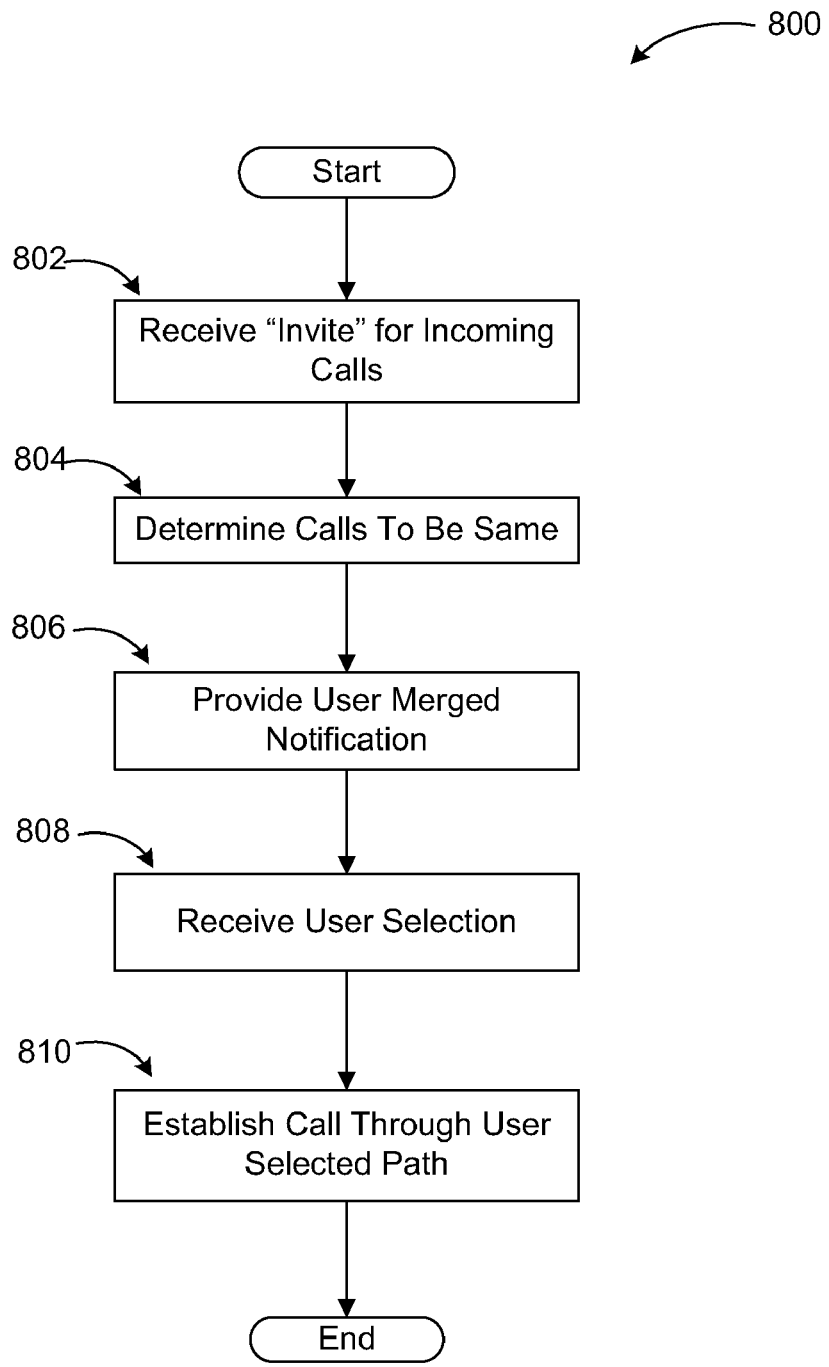
FIG. 8 illustrates a logic flow diagram for a process of merging notifications in a cross ringing system according to embodiments.

FIG. 8 illustrates a logic flow diagram for process 800 of merging call notifications in a cross ringing telephony system according to embodiments. Process 800 may be implemented in a client application managing multiple end devices for a user in a cross ringing system such as a UC client application.

Process 800 begins with operation 802, where the client application receives an invite message from a server of the cross ringing integrated system. The invite message is generated in response to an incoming call from an internal or external caller. Thus, the call may be forwarded to multiple end devices registered to the destination user. For example, a PSTN call may be destined to a PBX phone and a UC end device of a user. According to some embodiments, the invite message may include call origination information such as a caller ID, a SIP URI, etc. Processing advances from operation 802 to operation 804.

At operation 804, UC client application determines the calls to multiple end devices to be the same incoming call. The UC application may accomplish this by performing a reverse number look-up on the call origination identifiers of each received call and comparing them or by another method. The UC application may assign a correlation ID to the calls to indicate their correlation. According to other embodiments, a conversation ID, which is used to associate different forms of communication in an advanced communication system, may be used to indicate the calls being the same call from a single caller. Processing continues to operation 806 from operation 804.

At operation 806, the user is provided a merged call notification. Call notification may be a visual notification, an audio notification, or a combination of both. The UC client application may also provide additional information along with the merged call notification. For example, the call notification may be a conversation pop-up window that includes time of call, method of call, caller name, associated communications with the caller, options to access documents related to the caller, etc. The merged call notification also includes options for the user to select which of the available paths should be used for establishing the call (e.g. cellular versus VOIP). Processing advances to operation 808 from operation 806.

At operation 808, the user selection is received indicating which path the user prefers to use for the call. Processing then moves to operation 810, where the call is established through the path selected by the user. Once the call is established, other paths may be cancelled to prevent false missed call notifications or endless loops. After operation 810, processing moves to a calling process for further actions.

The operations included in process 800 are for illustration purposes. Merging call notification in cross ringing telephony systems may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for facilitating communications in a cross ringing telephony system employing merged notification, comprising:
simultaneously receiving at least two call indications through at least two communication paths associated with at least two different communication systems destined to a single user, the existence of the at least two different communication systems being transparent for other users who interact with the single user, the single user having a shared identity for the at least two different communication systems, the shared identify being used in inbound and outgoing calls, the shared identity comprising a plurality of formats, the plurality of formats comprising at least a telephone number and a Session Initiated Protocol Uniform Resource Identifier (SIP URI);
determining whether the simultaneously received call indications are for a call from a same calling entity; and
when the call indications are from the same calling entity:
providing a merged notification to the user, wherein the merged notification includes information associated with the at least two communication paths, wherein the merged notification includes a visual alert, the merged notification further comprising a conversation pop-up window with call parameter information, the call parameter information comprising a call time, a call origination, and a call type;
receiving a communication path selection from the user for call establishment; and
establishing the call based on the user selected communication path.

2. The method of claim 1, wherein determining whether the call indications are for a call from the same entity comprises:
receiving a call origination identifier for each call indication;
performing a caller database search based on the call origination identifiers to determine an identity of the calling entity;
comparing the determined identities of the calling entities for each call indication; and
if the identities are the same, designating the call indications for a call from the same calling entity.

3. The method of claim 2, wherein the call origination identifiers include at least one from a set of: a caller ID number, the SIP URI, and an alphanumeric caller identifier.

4. The method of claim 2, wherein performing a caller database search includes performing a reverse number look-up search.

5. The method of claim 2, further comprising:
assigning a correlation ID to each call indication based on the determined identities; and
designating the call indications for a call from the same calling entity if the correlation IDs are the same.

6. The method of claim 2, further comprising:
assigning a conversation ID to related communication types including at least one from a set of: an instant messaging session, an electronic mail exchange, a video communication session, and the established call; and
providing the user to an indication that another communication associated with the received call may be established with the same calling entity.

7. The method of claim 1, wherein the call indications are received through the at least two communication paths by one of parallel transmission and serial transmission.

8. The method of claim 1, wherein the at least two communication paths include two of: a Voice Over IP (VOIP) call, a cellular call, and a Public Switched Telephone Network (PSTN) call.

9. A computer configured by an executable client application managing end devices registered to a user in a cross ringing telephony system, the client application when executed performs actions comprising:
simultaneously receiving a plurality of call indications for an incoming call through a plurality of communication paths associated with a plurality of different communication systems destned to the user, wherein each call indication includes a call origination identifier user~the existence of the plurality of different communication systems being transparent for other users who interact with the user, the user having a shared identity for the plurality of different communication systems, the shared identify being used in inbound and outgoing calls, the shared identity comprising a plurality of formats, the plurality of formats comprising at least a telephone number and a SIP URI;
determining, based on a comparison of the call origination identifiers, whether the plurality of simultaneously received call indications are for a single incoming call;
providing a merged notification that includes a visual conversation pop-up window with call parameter information, the call parameter information comprising a call time, a call origination, and a call type;
receiving a user indication of acceptance of the incoming call through a selected communication path;
connecting the incoming call through an appropriate end device registered to the user; and
facilitating the call through the selected communication path.

10. The client application of claim 9, wherein one of the call indications is for a VOIP call and another one of the call indications is for a PSTN call, and the client application when executed:
performing a reverse number look-up for a caller ID associated with the PSTN call and a reverse URI look-up for a SIP URI associated with the VOIP call;
determining, based on a comparison reverse look-up results, whether the call indications are for a single incoming call; and
if the user selects the PSTN call, connecting the incoming call to the user's Private Branch Exchange (PBX) device, else connecting the incoming call to the user's VOIP end device.

11. The client application of claim 9, wherein one of the call indications is for a VOIP call and another one of the call indications if for a cellular call, and the client application when executed:
in response to receiving a VOIP invite transaction that precedes a setup transaction associated with the cellular call and receiving a user acceptance of the VOIP call, deflecting the incoming call through a cellular network and merging the incoming cellular call to the VOIP call.

12. The client application of claim 11, wherein the client application when executed:
enabling the cellular network to set up the cellular call while providing the merged notification to the user such that the cellular call is established without a delay if the user selects to accept the cellular call; and cancelling and deflecting the cellular call to the VOIP call, if the user selects to accept the VOIP call.

13. The client application of claim 9, wherein the client application when executed records a source of the incoming call, if the call is answered, such that another call from the same source is established in a similar manner to the original incoming call.

14. The client application of claim 9, wherein the client application when executed assigns one of a correlation ID and a conversation ID to the received call indications for determining whether the call indications are for the same call and for providing the user with additional information associated with the incoming call.

15. The client application of claim 9, wherein the end devices include one of a physical communication device, a communication application executed on a physical device, and a voicemail application.

16. A tangible computer-readable storage medium with instructions stored thereon for facilitating communications in a cross ringing telephony system employing merged notification, the instructions comprising:
   in response to simultaneously receiving a first call indication for an incoming VOIP call and a second call indication for one of a PSTN call and a cellular call for a user of the telephony system user:
      determining a calling entity for each simultaneously received call indication based on comparing results of a reverse look-up of a call origination identifiers included in the call indications and the call origination identifiers;
      assigning a correlation ID to each call based on the determined calling entities;
      determining the first and the second call indications to be from the same calling entity based on the correlation IDs;
      providing a visual merged notification to the user indicating available
      call establishment options, the merged notification further comprising a conversation pop-up window with call parameter information, the call parameter information comprising a call time, a call origination, and a call type;
      receiving a selection of a call establishment option from the user;
      if the selection is for the VOIP call, merging the other incoming call to the VOIP call; and
      if the selection is for one of the PSTN and the cellular calls, enabling the appropriate network to establish the call, and cancelling the VOIP call, the existence of a plurality of communication systems for the VOIP call, the PSTN call and the cellular call being transparent for other users who interact with the telephony system user, the telephony system user having a shared identity for the plurality of communication systems, the shared identify being used in inbound and outgoing calls, the shared identity comprising a plurality of formats, the plurality of formats comprising at least a telephone number and a Session Initiated Protocol Uniform Resource Identifier (SIP URI).

17. The computer-readable storage medium of claim 16, wherein the instructions further comprise:
   deflecting the incoming call to a voicemail system in response to another user selection.

18. The computer-readable storage medium of claim 16, wherein the call is established through an end device capable of facilitating at least two types of calls.

* * * * *